(12) United States Patent
Rouleau et al.

(10) Patent No.: US 11,437,791 B2
(45) Date of Patent: Sep. 6, 2022

(54) CABLE MANAGEMENT ASSEMBLY

(71) Applicant: Panduit Corp., Tinley Park, IL (US)

(72) Inventors: Rodney G. Rouleau, Manhattan, IL (US); Mateusz Kruzel, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 413 days.

(21) Appl. No.: 16/529,885

(22) Filed: Aug. 2, 2019

(65) Prior Publication Data

US 2020/0059075 A1 Feb. 20, 2020

Related U.S. Application Data

(60) Provisional application No. 62/718,633, filed on Aug. 14, 2018.

(51) Int. Cl.
*H02G 3/04* (2006.01)

(52) U.S. Cl.
CPC ......... *H02G 3/0406* (2013.01); *H02G 3/0456* (2013.01)

(58) Field of Classification Search
CPC ...... H02G 3/0406; H02G 3/0456; H02G 3/03; H02G 3/04; H02G 3/0412; H02G 3/045; H02G 3/24; H02G 3/26; H02G 3/263; H02G 3/30; H02G 5/002; H02G 5/10; H02G 3/32; F16L 3/00; F16L 3/24; F16L 3/243; F16L 3/2431; F16L 3/245; F16L 3/221; F16L 3/133; F16L 3/12; F16L 3/08
USPC .......... 248/74.5, 72, 68.1, 69, 73, 74.3, 210, 248/211, 236
See application file for complete search history.

(56) References Cited

U.S. PATENT DOCUMENTS

| | | | |
|---|---|---|---|
| 656,274 A | 8/1900 | Streeter | |
| 1,154,847 A * | 9/1915 | De Vore | B60R 13/105 248/297.31 |
| 2,152,891 A * | 4/1939 | Kohnke | E04G 7/18 403/385 |
| 3,053,494 A | 9/1962 | Stoll | |
| 4,395,009 A | 7/1983 | Bormke | |
| 4,679,754 A | 7/1987 | Richards | |
| 4,826,113 A * | 5/1989 | Winters | F16L 3/18 248/228.3 |

(Continued)

FOREIGN PATENT DOCUMENTS

FR 2461382 A1 1/1981
JP 2005318767 A 11/2005
(Continued)

*Primary Examiner* — Eret C McNichols
*Assistant Examiner* — Michael McDuffie
(74) *Attorney, Agent, or Firm* — Christopher S. Clancy; James H. Williams; Aimee E. McVady

(57) ABSTRACT

A cable management assembly that mounts cables to a ladder rack. The cable management assembly includes a thermal expansion block, a cable attachment beam, and a bracket. The thermal expansion block is positioned on a ladder rung of the ladder rack. The thermal expansion block has a top, a bottom, a first side, a second side, and ends. The first side and the second side of the thermal expansion block have an opening there through that receives the cable attachment beam. The bracket secures the thermal expansion block and attached cable attachment beam to the ladder rung.

8 Claims, 17 Drawing Sheets

(56) References Cited

U.S. PATENT DOCUMENTS

| | | | | |
|---|---|---|---|---|
| 5,106,040 | A * | 4/1992 | Cafmeyer | H02G 3/26 248/292.14 |
| 5,960,905 | A * | 10/1999 | Gardner | E06C 7/143 248/210 |
| 6,244,548 | B1 * | 6/2001 | Gillette | E06C 7/146 248/210 |
| 6,926,236 | B2 * | 8/2005 | Jette | H02G 3/0456 248/65 |
| 7,789,359 | B2 * | 9/2010 | Chopp, Jr. | H02G 3/0456 248/210 |
| 7,922,130 | B2 * | 4/2011 | Hawkins | F16L 3/243 248/74.2 |
| 8,294,030 | B2 | 10/2012 | Pollard, Jr. | |
| 8,558,112 | B2 | 10/2013 | Pawluk | |
| 8,757,560 | B2 | 6/2014 | Darnell | |
| 8,958,681 | B2 * | 2/2015 | Ripplinger | G02B 6/46 385/136 |
| 9,309,719 | B2 | 4/2016 | Sylvester et al. | |
| 9,472,937 | B2 | 10/2016 | Klein | |
| 9,587,433 | B2 | 3/2017 | Sylvester et al. | |
| 9,810,021 | B2 | 11/2017 | Sylvester et al. | |
| 9,882,365 | B2 | 1/2018 | Sylvester et al. | |
| 10,844,978 | B2 * | 11/2020 | Meyer | F16L 3/221 |
| 2004/0113024 | A1 * | 6/2004 | Caveney | H02G 3/0456 248/68.1 |
| 2005/0098697 | A1 * | 5/2005 | Collins | F16L 3/13 248/231.71 |
| 2006/0284027 | A1 * | 12/2006 | Smith | F16L 55/035 248/65 |
| 2011/0084179 | A1 | 4/2011 | Wiedner et al. | |
| 2011/0315829 | A1 * | 12/2011 | Darnell | H02G 3/0456 248/67.5 |
| 2012/0012715 | A1 | 1/2012 | Andersen et al. | |
| 2012/0073237 | A1 | 3/2012 | Brown | |
| 2014/0061412 | A1 * | 3/2014 | Suzuki | F16B 33/002 248/226.11 |
| 2015/0337992 | A1 * | 11/2015 | McCarter | F16L 3/24 248/65 |
| 2015/0353319 | A1 * | 12/2015 | Henderson | H02G 1/06 248/68.1 |
| 2016/0138634 | A1 * | 5/2016 | Zhang | F16L 3/24 52/698 |
| 2016/0327187 | A1 * | 11/2016 | Brown | F16L 3/221 |
| 2017/0197554 | A1 * | 7/2017 | Rouleau | B60R 9/0485 |
| 2019/0214803 | A1 * | 7/2019 | Varale | H02G 3/34 |
| 2019/0234531 | A1 * | 8/2019 | Brouwer | H02G 3/32 |
| 2020/0078625 | A1 * | 3/2020 | Mitchell | F16L 3/1075 |

FOREIGN PATENT DOCUMENTS

| | | |
|---|---|---|
| JP | 2011062025 A | 3/2011 |
| WO | 8804486 A1 | 6/1988 |
| WO | 9910957 A1 | 3/1999 |

* cited by examiner

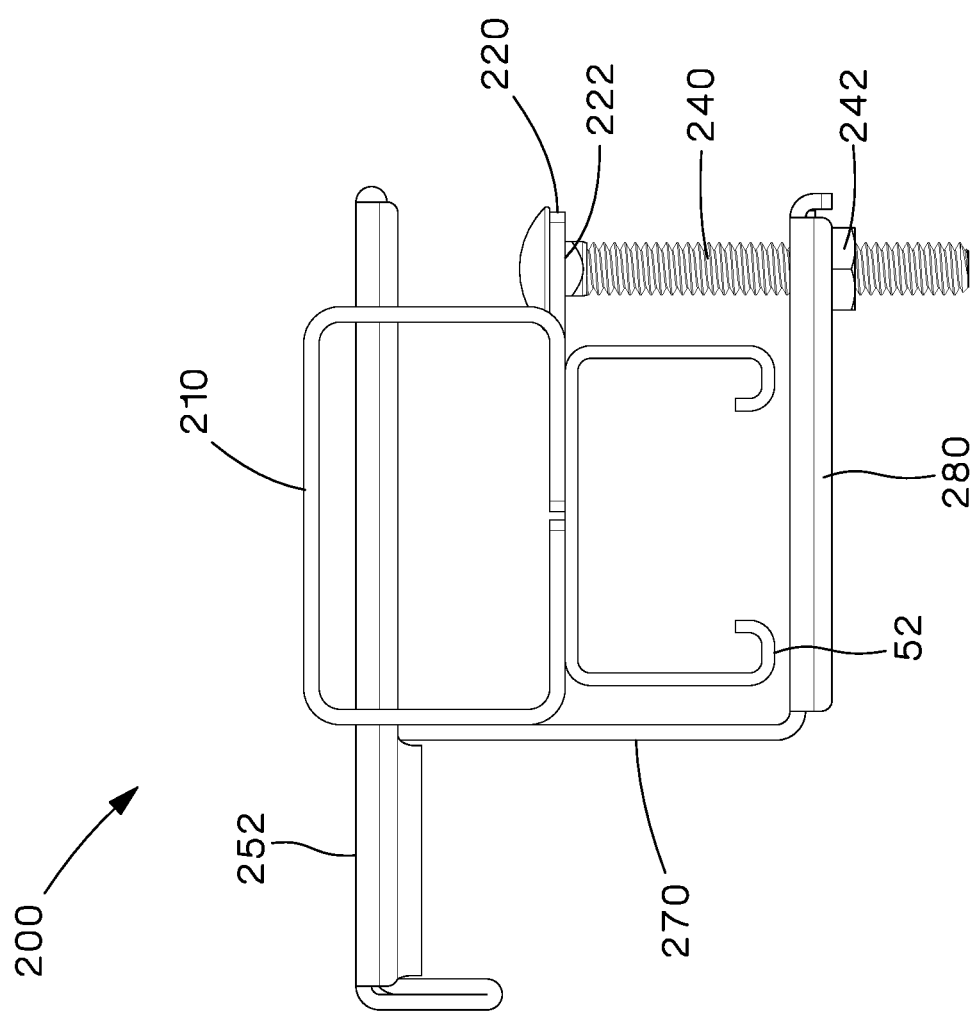

CABLE MANAGEMENT ASSEMBLY

CROSS REFERENCE TO RELATED APPLICATION

This application claims priority to U.S. Provisional Application No. 62/718,633, filed Aug. 14, 2018, the subject matter of which is hereby incorporated by reference in its entirety.

FIELD OF THE INVENTION

The present invention relates to a cable management assembly, and more particularly to a thermal expansion block for mounting cables to a ladder rack.

BACKGROUND OF THE INVENTION

Brackets and straps are typically used to secure cables to ladder racks for short circuit protection or general fastening. A common problem occurs when the cables attached to ladder racks expand or contract. The cables expand or contract at a different rate compared to the ladder rack. The cables move and as a result the connection between the cables and the ladder rack is often broken or damaged. Also, the expansion or contraction of the cables results in relative length changes that will put the cables under compression or tension depending on the direction of the temperature changes. In some situations, the thermal expansion joints of the cable tray will make the problem worse. The relative length differences between the cables and the tray can result in cable distortion, broken rungs, damaged brackets and ladder rack damage.

Therefore, it is desirable to improve the connection of the cables to the ladder racks to enable the cables to expand and contract independently thereby reducing the forces that build within the cables and eliminating damage to the cables and the ladder rack.

SUMMARY OF THE INVENTION

A cable management assembly that mounts cables to a ladder rack is disclosed. The cable management assembly includes a thermal expansion block, a cable attachment beam, and a bracket. The thermal expansion block is positioned on a ladder rung of the ladder rack. The thermal expansion block has a top, a bottom, a first side, a second side, and ends. The first side and the second side of the thermal expansion block have an opening there through. The cable attachment beam is positioned through the openings in the sides of the thermal expansion block. The sides of the thermal expansion block also have outwardly extending flanges with an opening. The bracket is secured to the thermal expansion block by fasteners extending through the openings in the outwardly extending flanges. The bracket secures the thermal expansion block to the ladder rung.

BRIEF DESCRIPTION OF THE DRAWINGS

FIG. 17 is a front view of the assembled thermal expansion block and cable management beam of FIG. 14.

DETAILED DESCRIPTION

Figure 1:
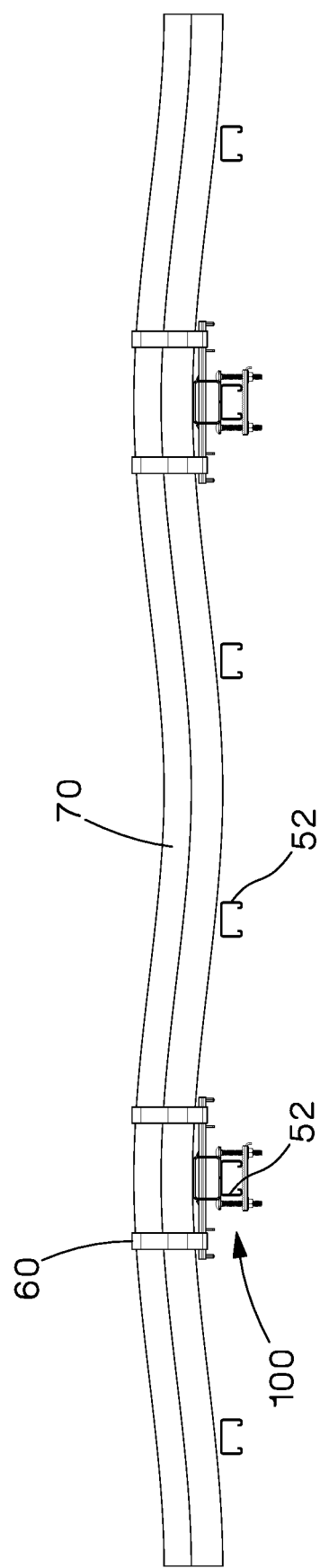
FIG. 1 is a front view of a first embodiment of the cable management assembly of the present invention mounting cables to ladder rungs.
Figure 2:
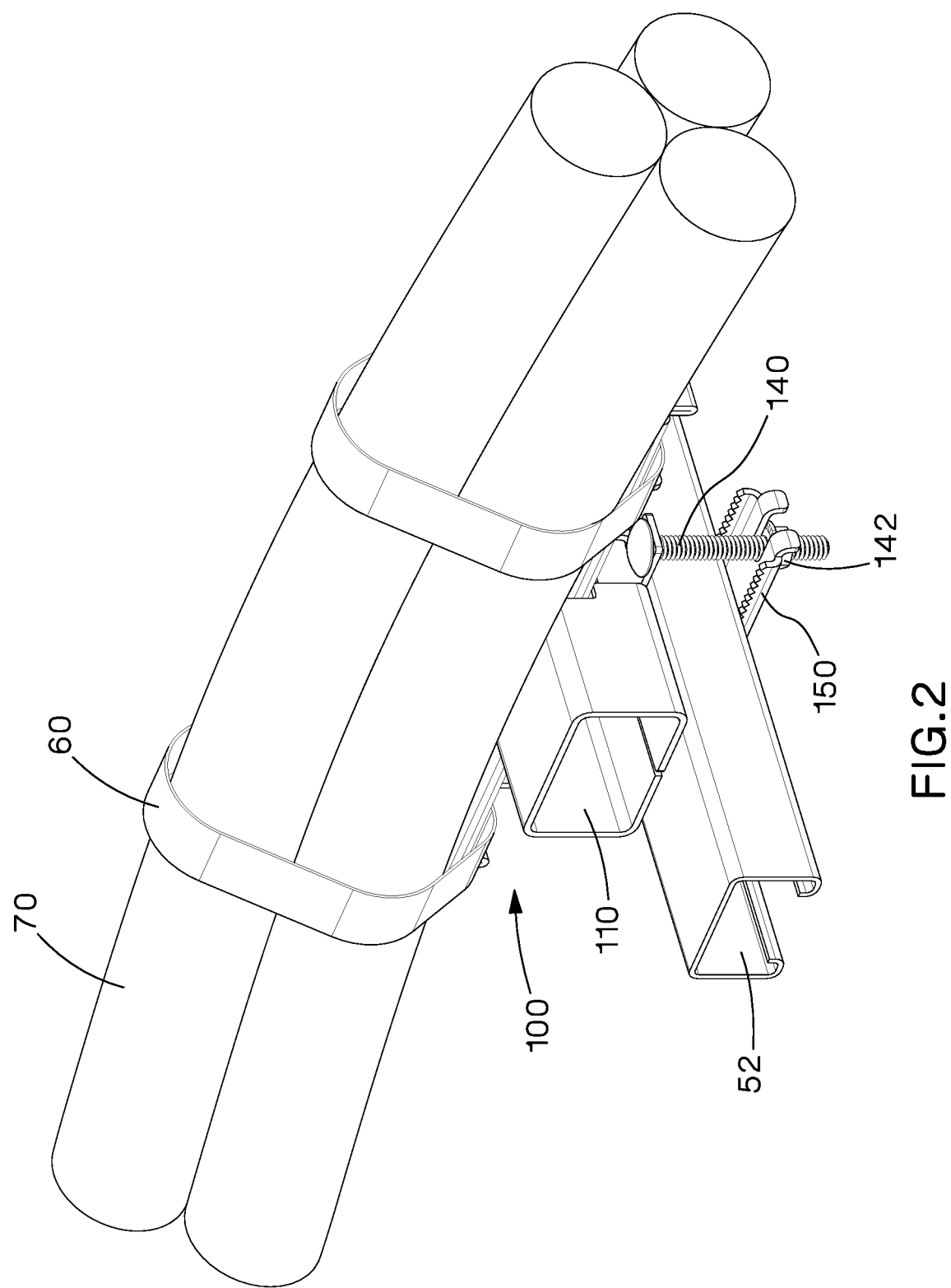
FIG. 2 is a right perspective view of one of the thermal expansion blocks of FIG. 1 mounting cables to a ladder rung.
Figure 3:
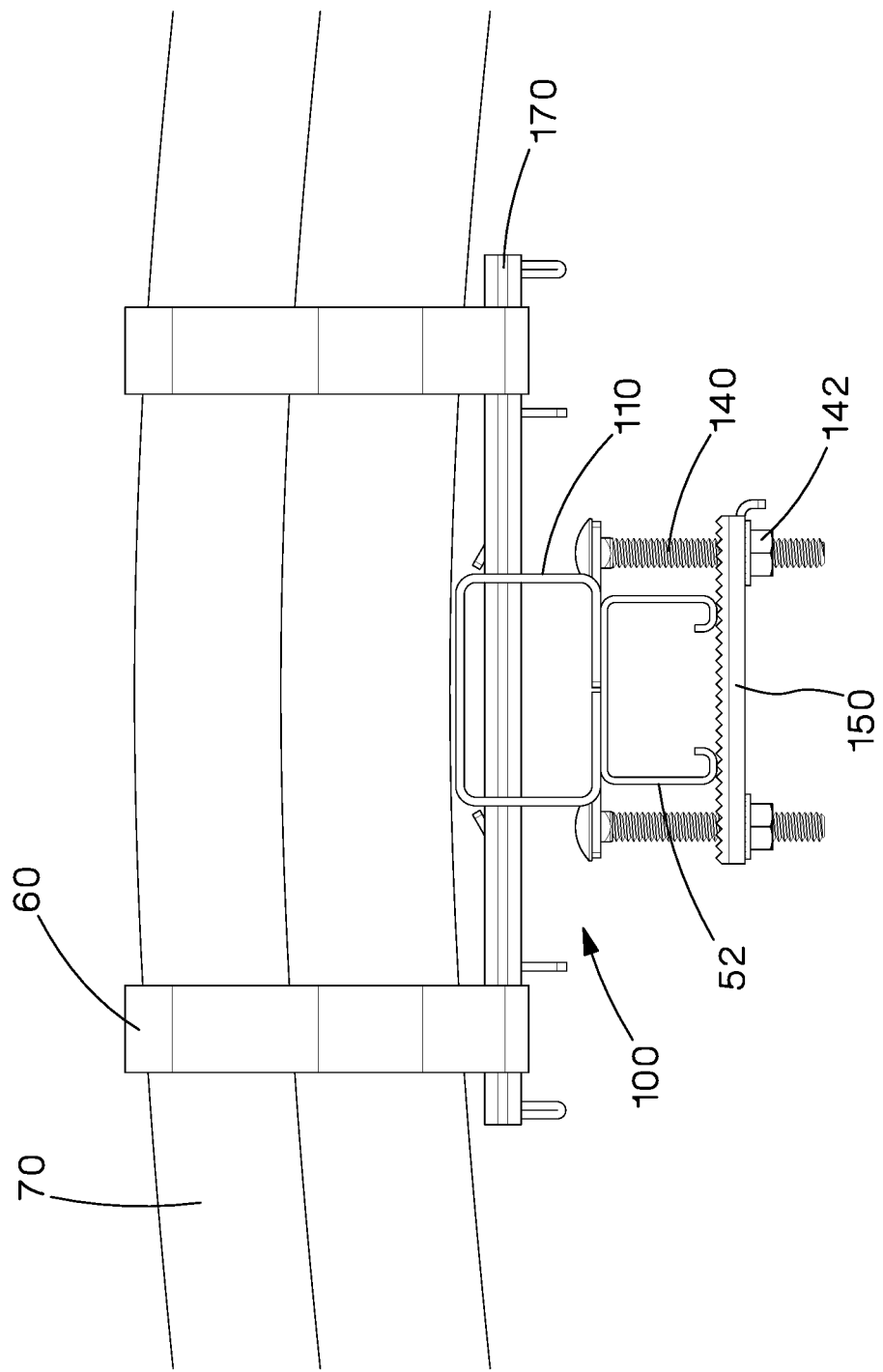
FIG. 3 is a front view of the thermal expansion block of FIG. 2 mounting cables to a ladder rung.

The present invention is developed to solve the problem cause by thermal expansion differential between electric cables and the ladder racks the cable are mounted thereto. The cable management assembly of the present invention includes a thermal expansion block mounted periodically under the cables on top of the ladder rungs. The thermal expansion block lifts the cables off of the ladder rung pre-forming bulges that will be growing and shrinking with temperature changes and allow expanding cables to flex without deforming the ladder rack.

FIGS. 1-9 illustrate a first embodiment of the cable management assembly 100 of the present invention. The first embodiment of the cable management assembly 100 includes a thermal expansion block 110, a serrated bracket 150 attached to the thermal expansion block 110 via carriage bolts 140 or other fastener, and a cable attachment beam 170.

Figure 4:
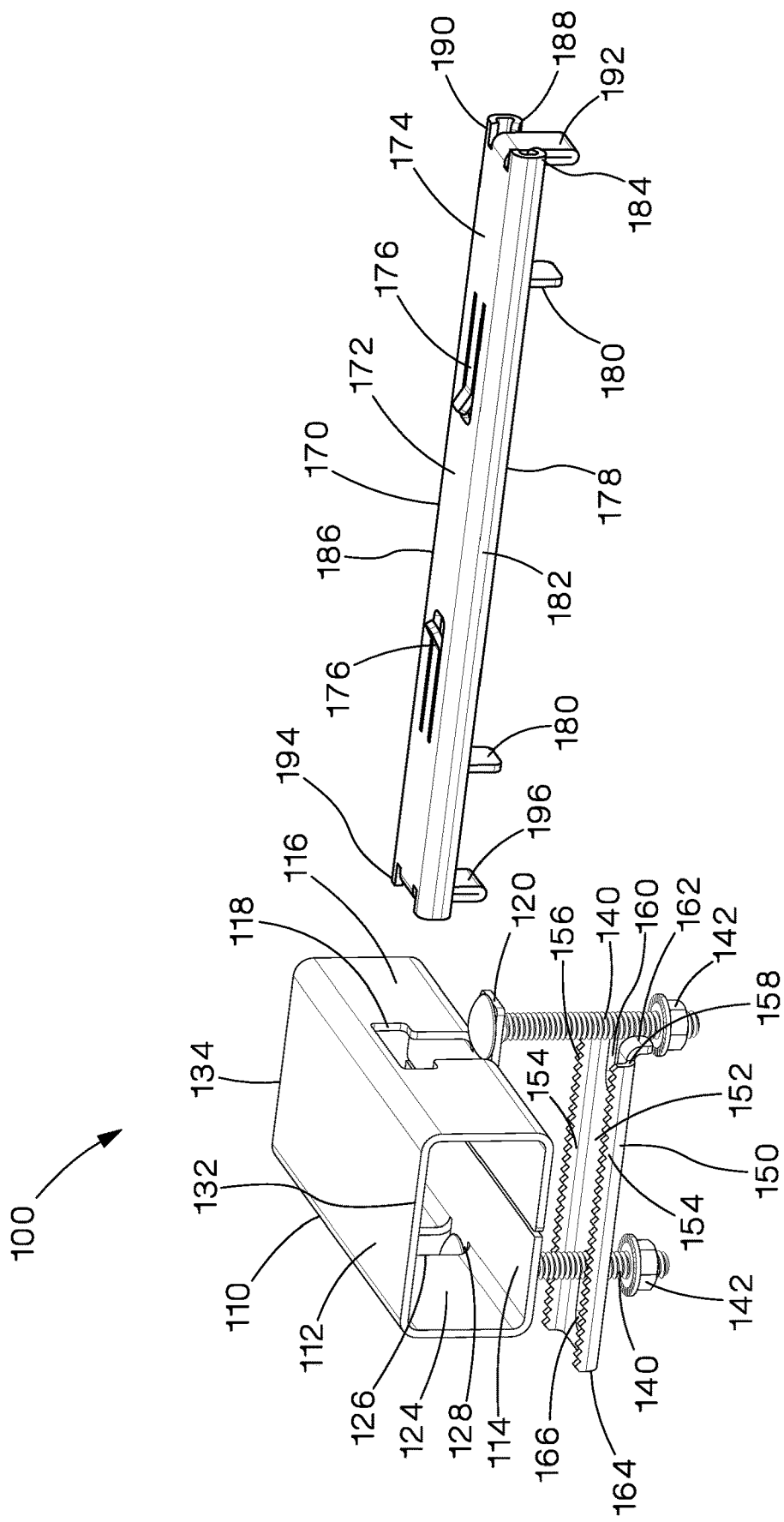
FIG. 4 is an exploded view of the thermal expansion block and cable attachment beam of FIG. 3.
Figure 5:
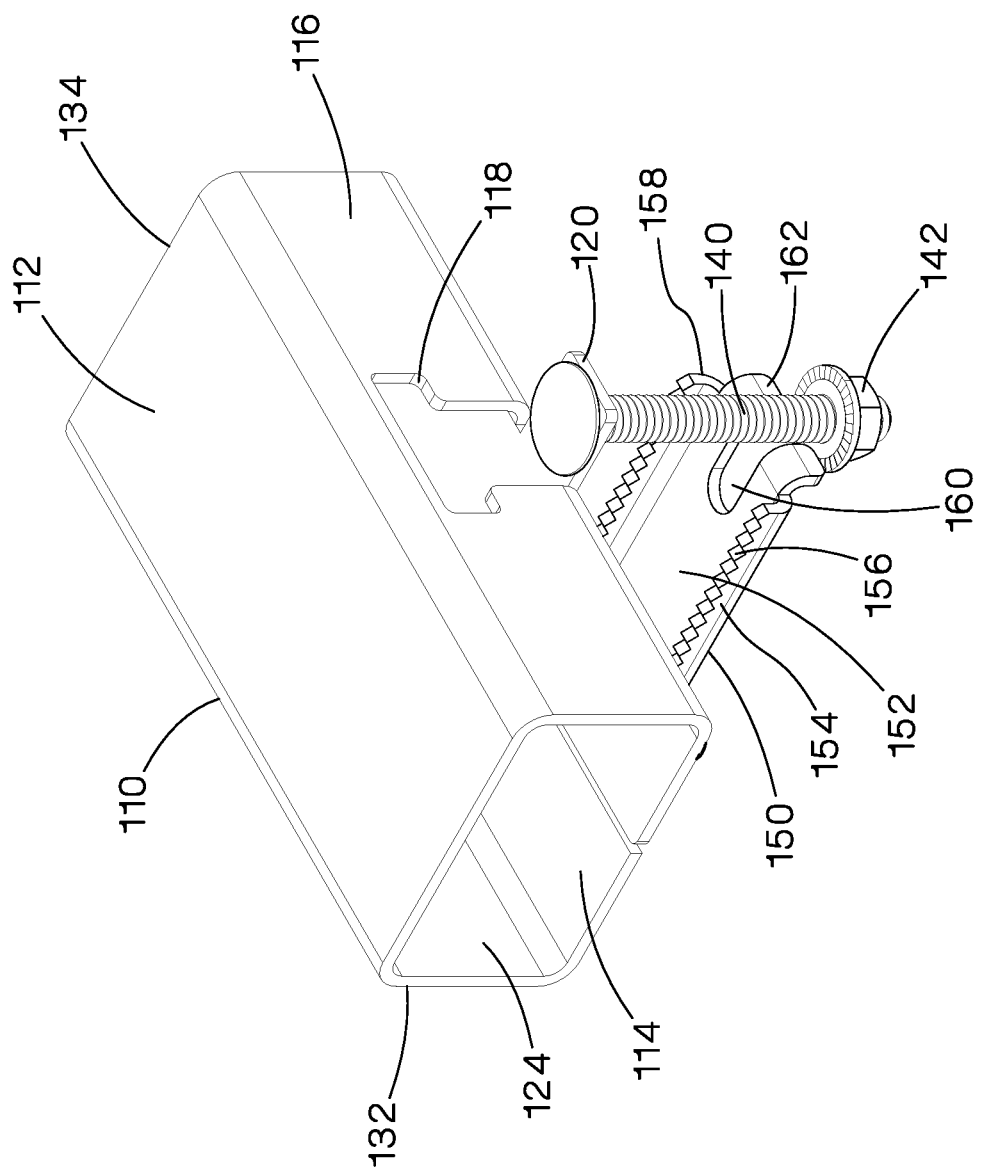
FIG. 5 is a top right perspective view of the thermal expansion block of FIG. 4
Figure 6:
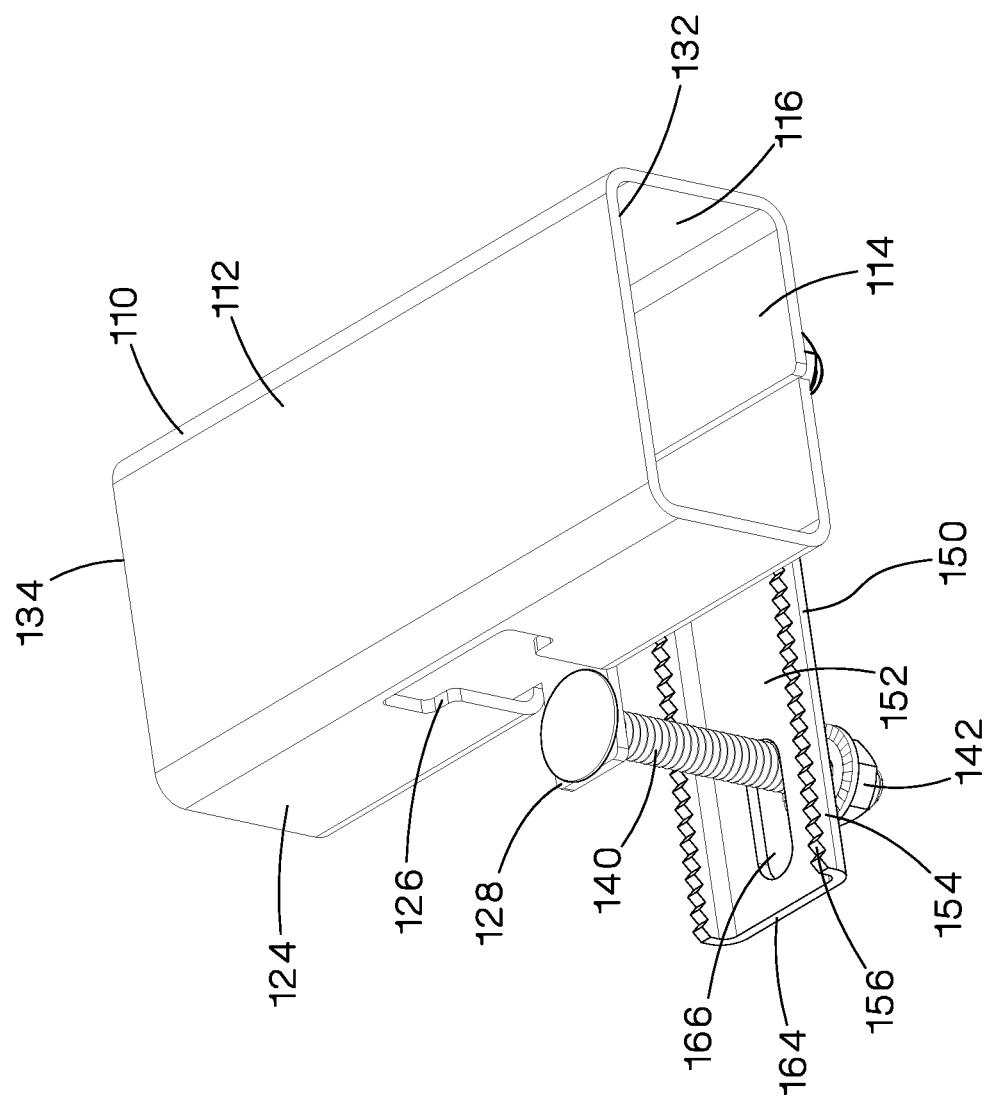
FIG. 6 is a top left perspective view of the thermal expansion block of FIG. 4.
Figure 7A:
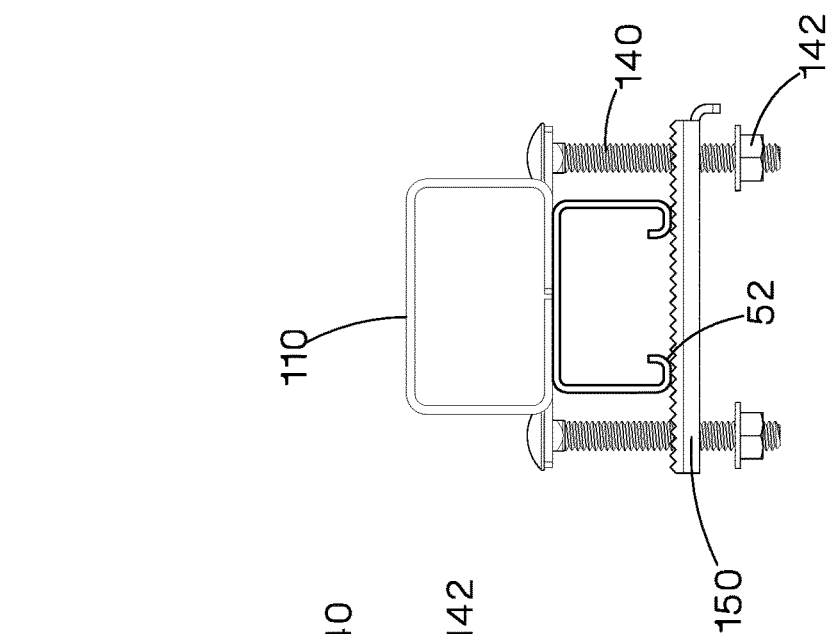
FIG. 7A is a front view of the thermal expansion block of FIG. 4 being positioned on a ladder rung.
Figure 7B:
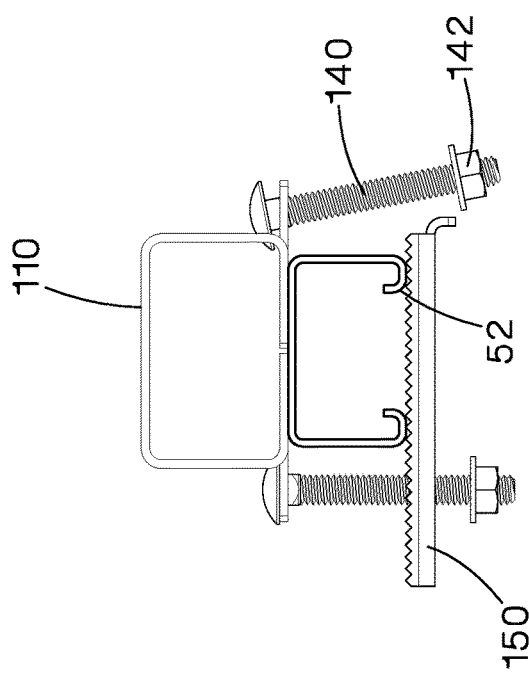
FIG. 7B is a front view of the thermal expansion block of FIG. 7A positioned on a ladder rung prior to the bracket being secured.
Figure 7C:
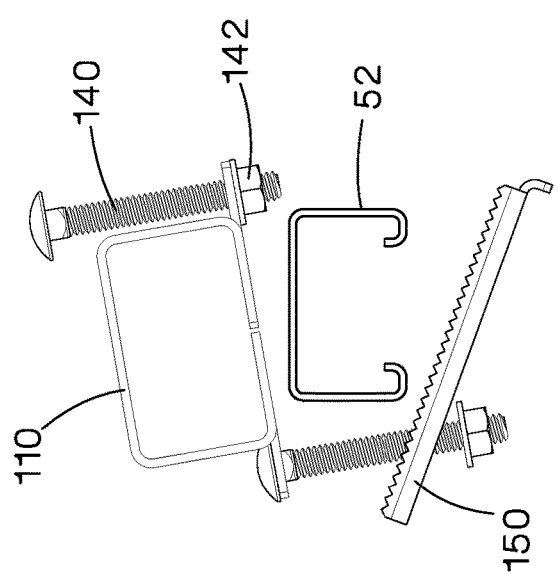
FIG. 7C is a front view of the thermal expansion block of FIG. 7B positioned on a ladder rung with the bolts positioned to be secured in the bracket.

As illustrated in FIGS. 4-6, the thermal expansion block is a rectangular block 110 with a top 112, a bottom 114, a first side 116 and a second side 124. Each end 132, 134 of the thermal expansion block 110 is open. Each side 116, 124 of the thermal expansion block includes a T-shaped cutout opening 118, 126 and an outwardly extending flange 120, 128, respectively. The T-shaped cutout openings 118, 126 in each side 116, 124, respectively, are aligned to create a passageway through the thermal expansion block 110. Each outwardly extending flange 120, 128 extends from the bottom 114 of the expansion block 110 at the T-shaped cutout opening 118, 126, respectively. Each outwardly extending flange 120, 128 includes a mounting hole 122, 130, respectively, for receiving one of the carriage bolts 140. As illustrated in FIGS. 4-6, the carriage bolts 140 are maintained on the outwardly extending flanges 120, 128.

The bracket 150 is secured to the thermal expansion block 110 via the carriage bolts 140. The bracket 150 includes a main member 152 with sides 154 having serrated edges 156. The main member 152 includes a first end 158 with a U-shaped slot 160 and folded edges 162. The main member 152 also includes a second end 164 with a slot 166. The carriage bolts 140 extend through the U-shaped slot 160 and the slot 166. As illustrated and described with respect to FIGS. 7A-7C, the carriage bolts 140 slide within the U-shaped slot 160 and the slot 166 of the bracket 150 to enable the thermal expansion block 110 to be positioned on and secured to a ladder rung 52.

Figure 8:
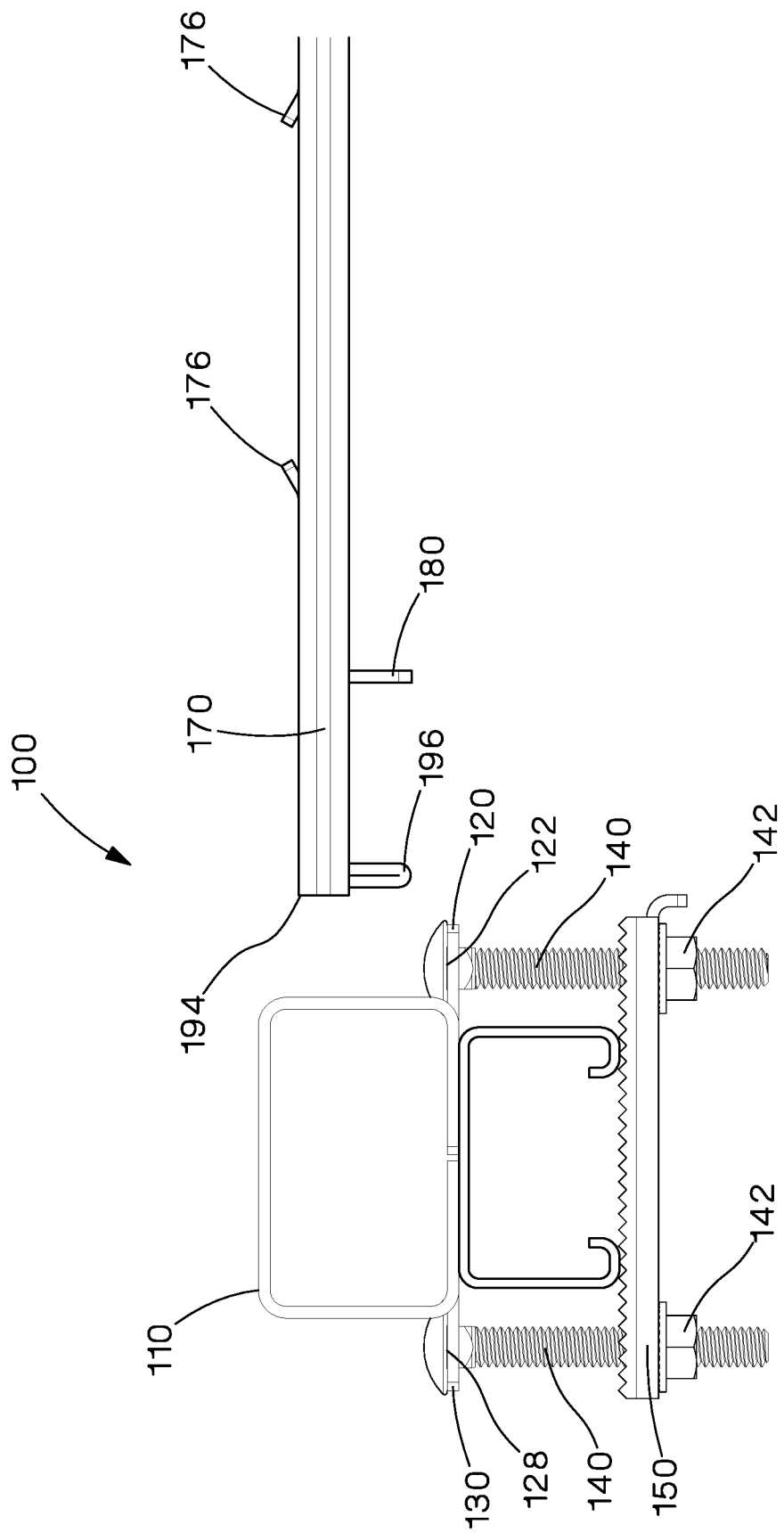
FIG. 8 is a front view of the assembled thermal expansion block of FIG. 7C with the bolts secured and a cable attachment beam positioned to be installed in the thermal expansion block.
Figure 9:
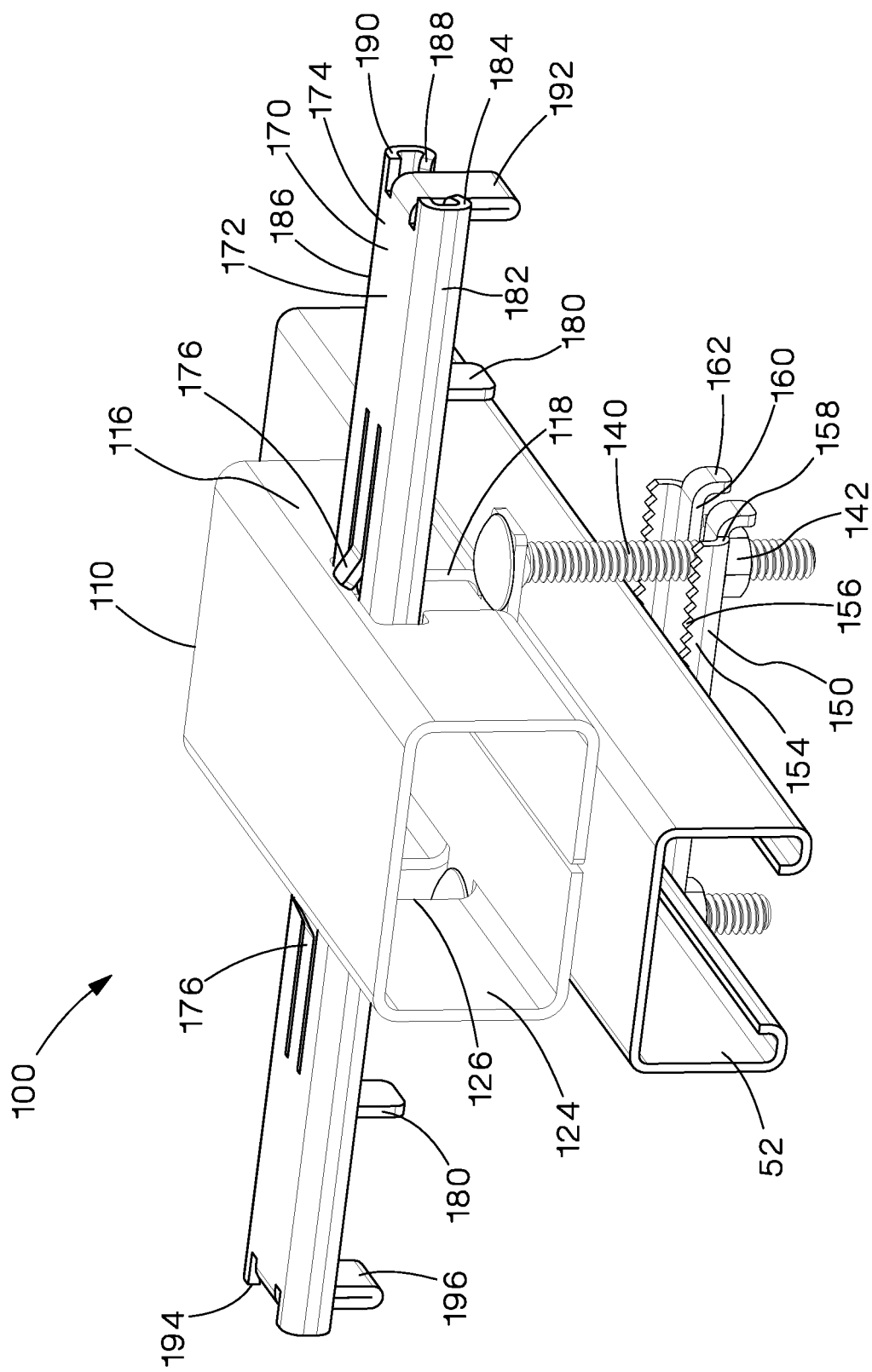
FIG. 9 is a perspective view of the assembled thermal expansion block and cable attachment beam of FIG. 8.
Figure 10:
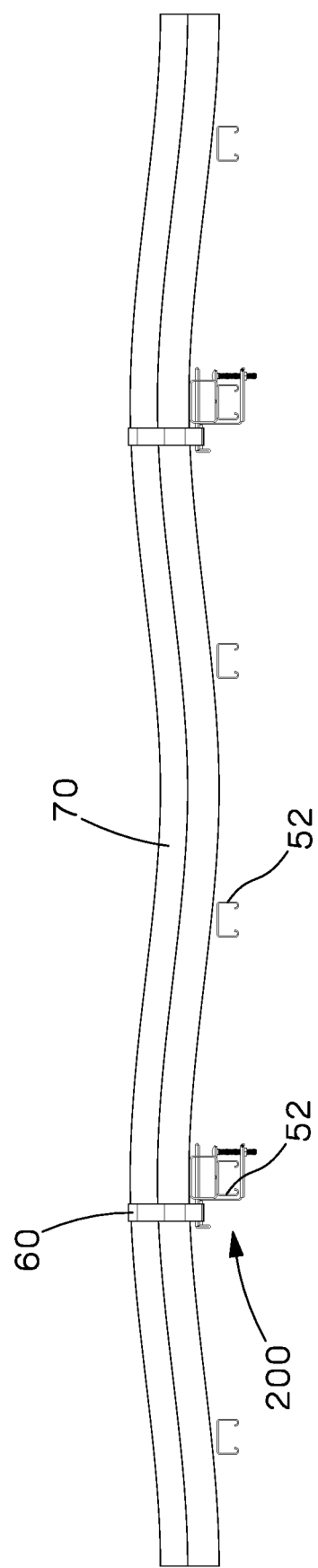
FIG. 10 is a front view of a second embodiment of the cable management assembly of the present invention mounting cables to ladder rungs.

FIGS. 4 and 8-9 illustrate the cable attachment beam 170. The cable attachment beam 170 is an elongate member 172 with a top 174, a bottom 178, sides 182, 186, and ends 190, 194. The sides 182, 186 and ends 190, 194 include folded edges 184, 188 and 192, 196, respectively, to protect the cable cleat 60 during a short circuit event. Beam retaining clips 176 extend from the top 174 of the cable attachment beam 170. The beam retaining clips 176 are centered on the cable attachment beam 170 and are positioned from each other such that the thermal expansion block 110 may be positioned between the beam retaining clips 176, as illustrated in FIG. 9. The bottom 178 of the cable attachment beam 170 includes centered flanges 180 that are spaced from the folded edges 192, 196 of the ends 190, 194. The centered flanges 180 and the folded edges 192, 196 define a mounting area for the cable cleats 60.

As illustrated in FIGS. 7A-7C, 8 and 9, the serrated bracket 150 secures the thermal expansion block 110 to the ladder rung 52. The serrated bracket 150 attaches to the thermal expansion block 110 using carriage bolts 140 and nuts 142. The carriage bolts 140 are attached with the nuts 142 loosely secured so the bolts 140 can slide to manipulate the bracket 150 to be placed under the ladder rung 52 (see FIG. 7A). Once the thermal expansion block 110 is positioned on the ladder rung 52, the bracket 150 is slid into position engaging the carriage bolt 140 (see FIG. 7C). Next, the nuts 142 are tensioned to firmly secure the bracket 150 to the thermal expansion block 110.

As illustrated in FIG. 9, the cable attachment beam 170 slides through the T-shaped cutout openings 118, 126 in the sides 116, 124 of the thermal expansion block 110. The cable attachment beam 170 is locked in a centered position as the beam retaining clips 176 spring up after passing through the T-shaped openings 118, 126 in the thermal expansion block 110. Once installed, the cable attachment beam 170 receives the cable cleats 60, or similar device, to attach cables 70 to the thermal expansion block 110.

FIGS. 10-17 illustrate a second embodiment of the cable management assembly 200 of the present invention. The second embodiment of the cable management assembly 200 includes a thermal expansion block 210 and a bracket 250 attached to the thermal expansion block 210 via a carriage bolt 240.

Figure 11:
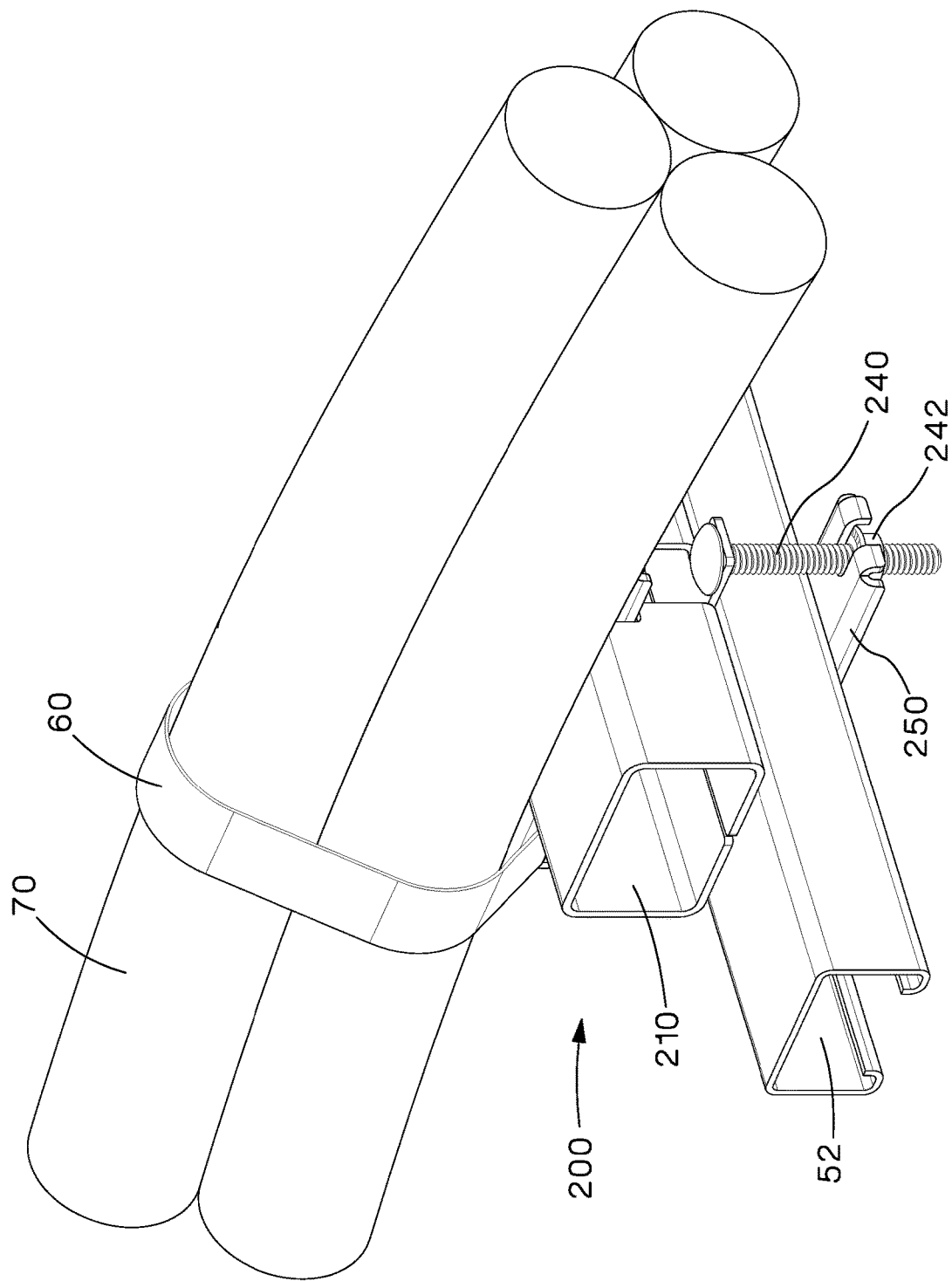
FIG. 11 is a right perspective view of one of the thermal expansion blocks of FIG. 10 mounting cables to a ladder rung.
Figure 12:
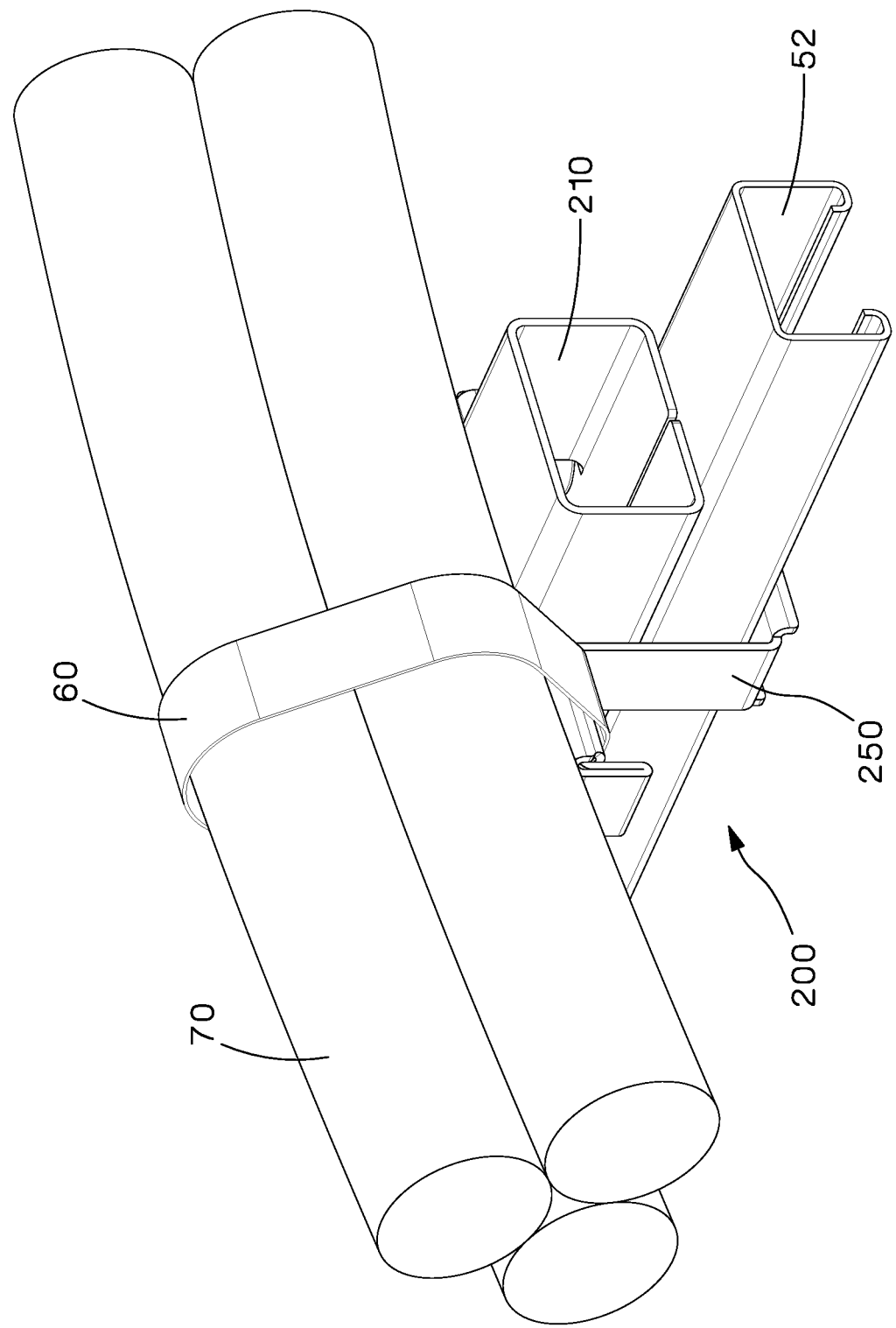
FIG. 12 is a left perspective view of one of the thermal expansion blocks of FIG. 10 mounting cables to a ladder rung.
Figure 13:
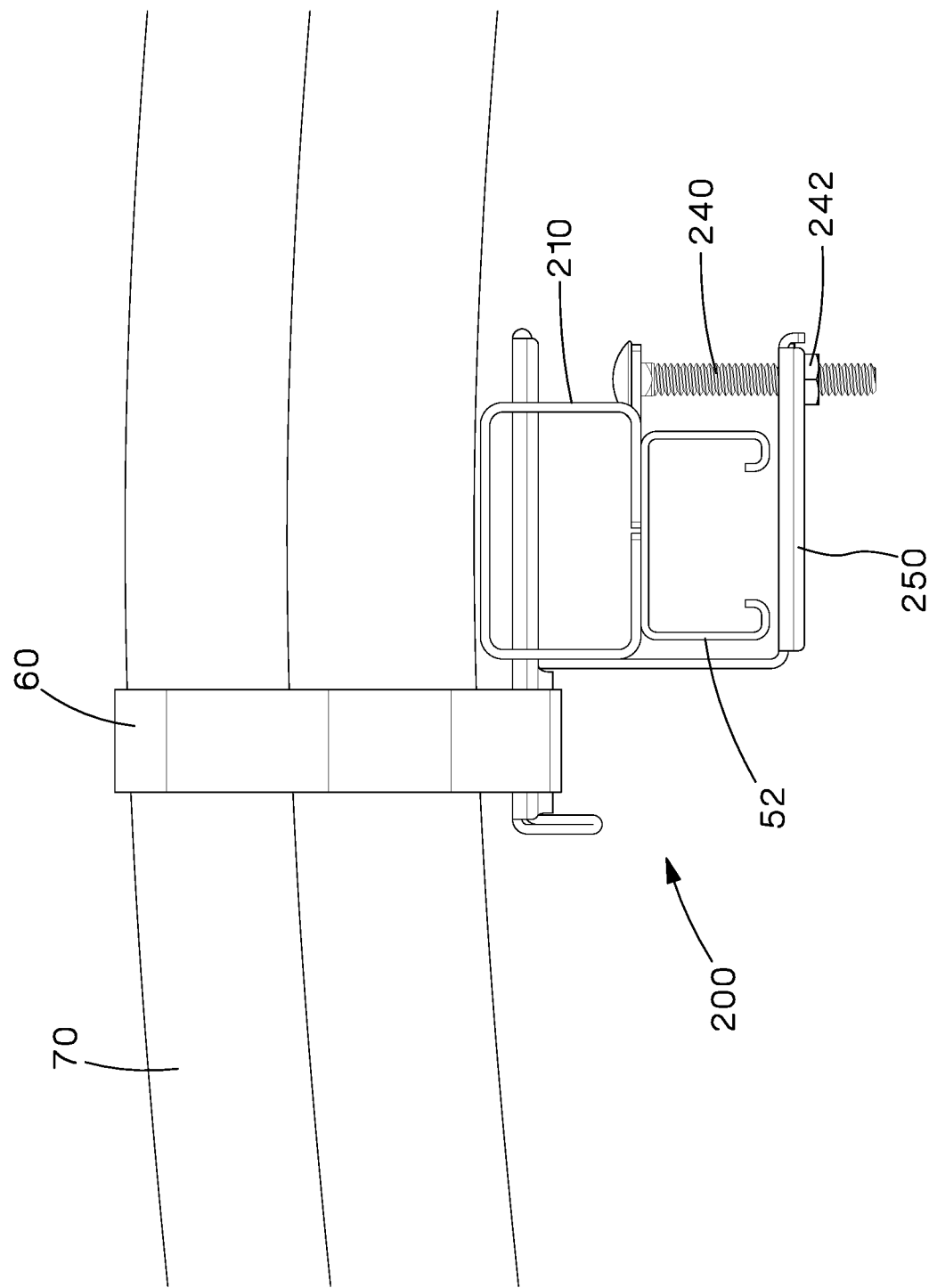
FIG. 13 is a front view of one of the thermal expansion blocks of FIG. 10 mounting cables to a ladder rung.

FIGS. 11-13 illustrate the second embodiment 200 secured to ladder rungs 52. Each thermal expansion block 210 is installed on a ladder rung 52 using the bracket 250 that slides thru the thermal expansion block 210 and wraps around the ladder rung 52. A carriage bolt 240 and nut 242 are attached to the thermal expansion block 210 and engage the bracket 250. Once the bracket 250 is installed in the thermal expansion block 210, the nut 242 is tensioned to affix the thermal expansion block 210 and bracket 250 to the ladder rung 52. The bracket 250 receives a cable cleat 60, or other similar device, to attach cable 70 to the top of the thermal expansion block 210.

Figure 14:
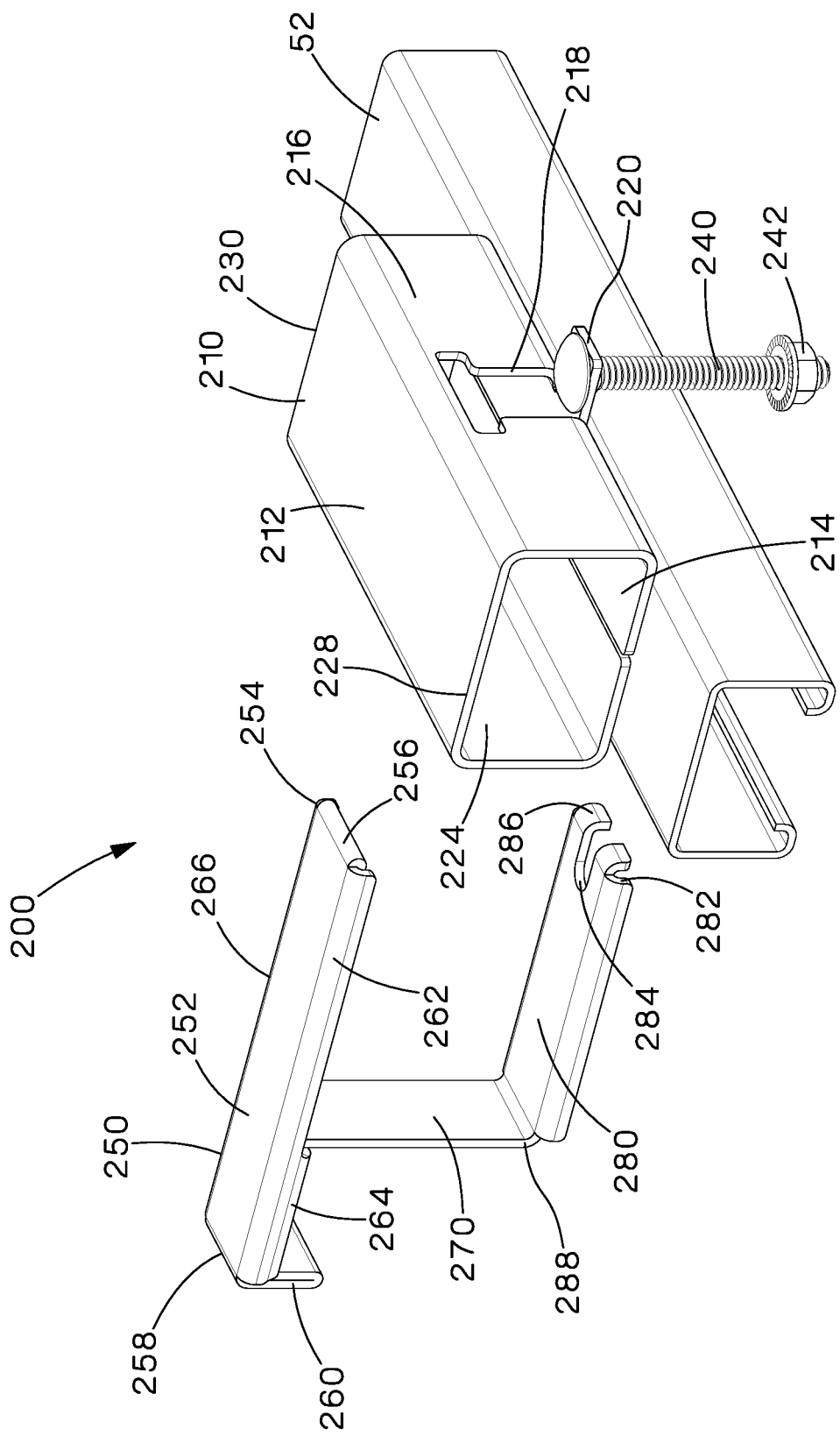
FIG. 14 is a right exploded view of the thermal expansion block and cable attachment beam of FIG. 11.
Figure 15:
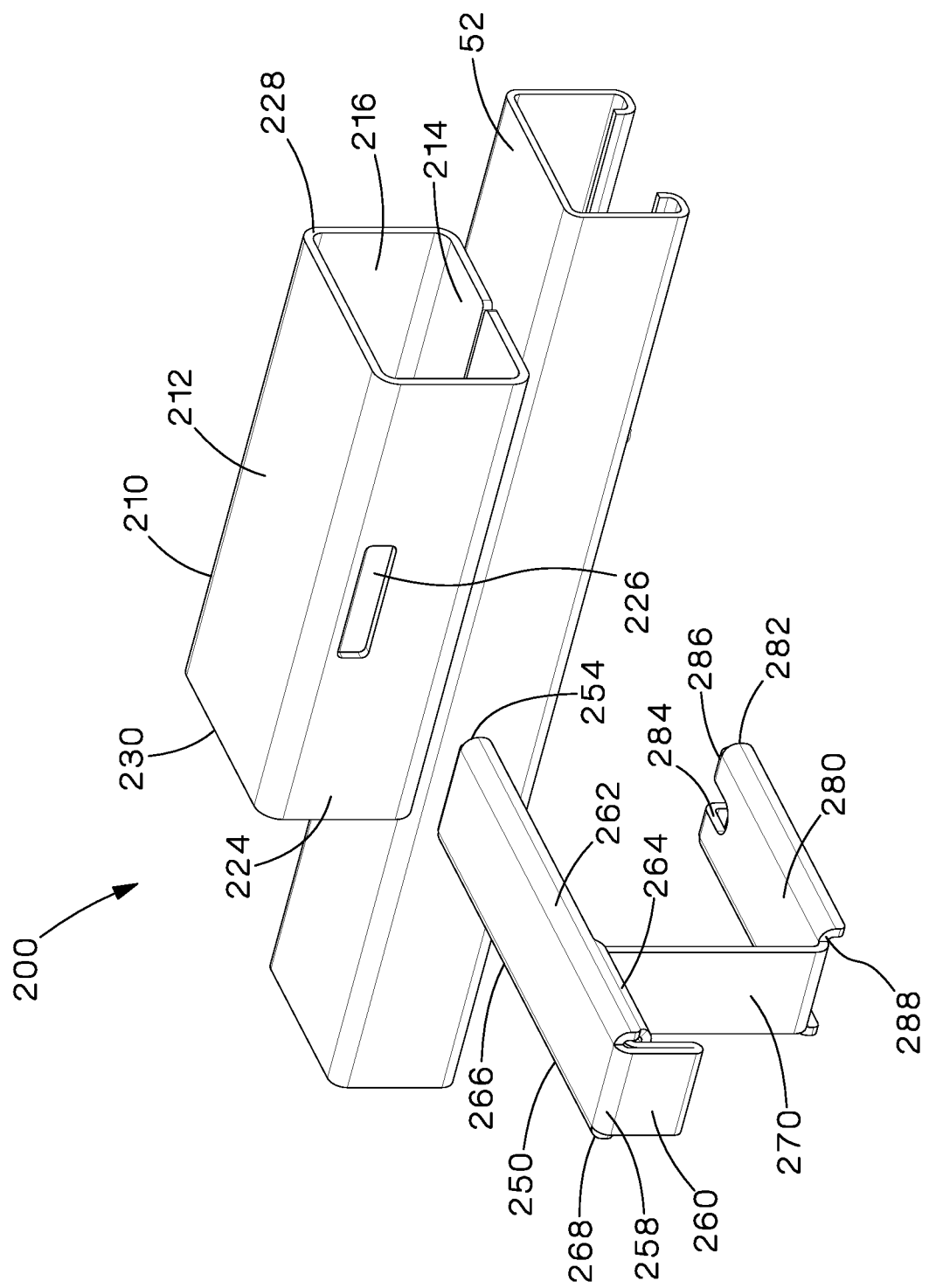
FIG. 15 is a left exploded view of the thermal expansion block and cable management beam of FIG. 14.
Figure 16:
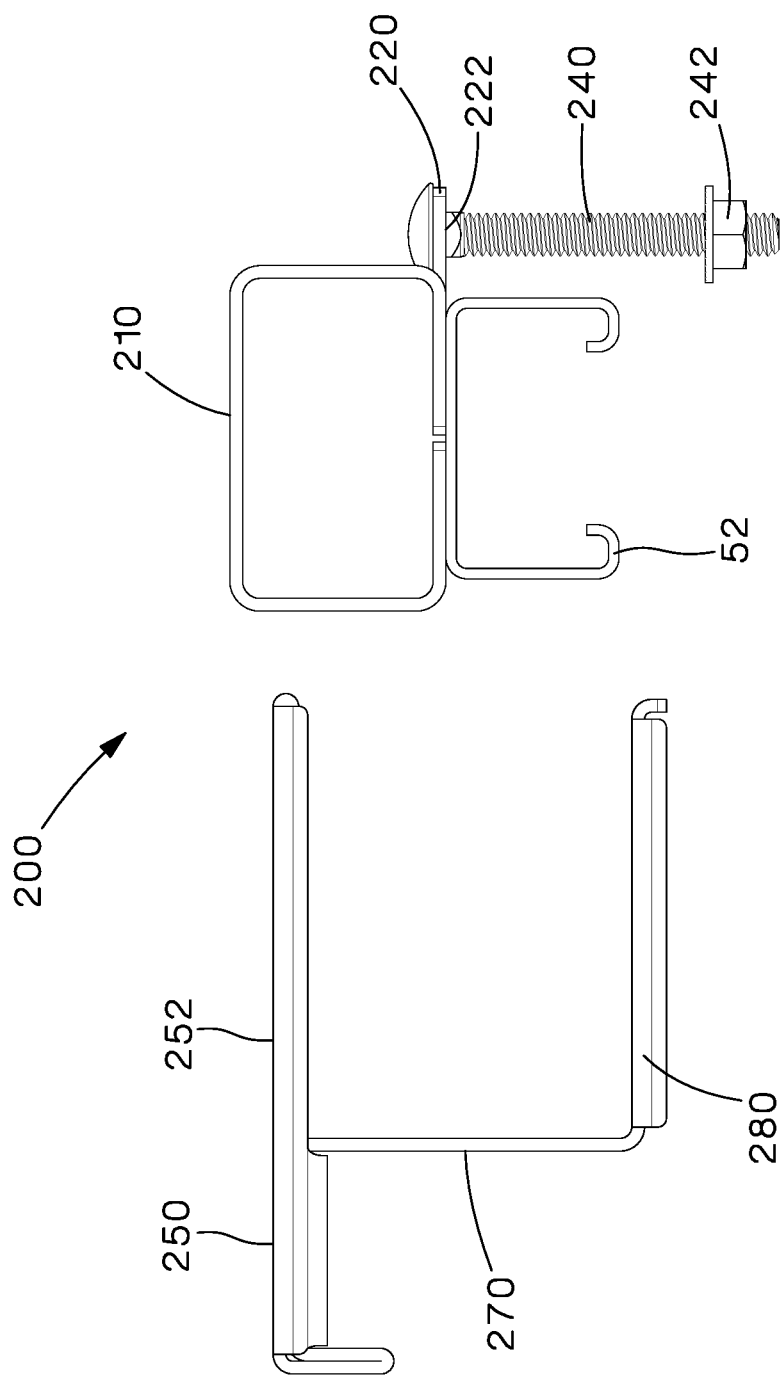
FIG. 16 is a front exploded view of the thermal expansion block and cable management beam of FIG. 14.

As illustrated in FIGS. 14-16, the thermal expansion block 210 is a rectangular block with a top 212, a bottom 214, a first side 216 and a second side 224. Each end 228, 230 of the thermal expansion block 210 is open. A first side 216 of the thermal expansion block 210 includes a T-shaped cutout opening 218 and an outwardly extending flange 220 (see FIG. 14). A second side 224 of the thermal expansion block 210 includes a rectangular slot 226 (see FIG. 15). The T-shaped cutout opening 218 aligns with the rectangular slot 226 to create a passageway therethrough. The outwardly extending flange 220 extends from the bottom of the expansion block 210 at the T-shaped cutout opening 218. The outwardly extending flange 220 includes a mounting hole 222 for receiving the carriage bolt 240 and attached nut 242. As illustrated in FIG. 14, the first end of the carriage bolt 240 is maintained on the outwardly extending flange 220.

The bracket 250 includes an upper member 252, a middle member 270 and a lower member 280 that extends parallel to the upper member 252. The upper member 252 includes a first end 254 and a second end 258 with folded edges 256, 260, respectively. The upper member 252 also includes side flanges 262, 266 with the side flanges 262, 266 adjacent the second end 258 having folded edges 264, 268 to protect the cable cleat 60 during a short circuit event.

The lower member 280 includes a first end 282 with a U-shaped slot 284 and folded edges 286 and a second end 288. As illustrated in FIGS. 11, 13, and 17, the U-shaped slot 284 receives the carriage bolt 240 to enable the bracket 250 to be secured to the thermal expansion block 210.

The middle member 270 of the bracket 250 extends between the upper member 252 and the second end 288 of the lower member 280. The middle member 270 extends at least the height of the ladder rung 52. The middle member 270 and the second end 258 of the upper member 252 define an area for receiving the cable cleat 60.

FIG. 17 illustrates the upper member 252 of the bracket 250 installed through the slot 226 and the T-shaped opening 218 in the thermal expansion block 210. The carriage bolt 240 extends through the U-shaped slot 284 in the bracket 250 and the nut 242 is tensioned to secure the bolt 240 and bracket 250 to the thermal expansion block 210.

The cable management assemblies of the present invention enable proper operation of the cable installation regardless of environment temperature changes. The cable management assemblies provide robust anchoring points to install cable to the ladder racks using MS75 cable cleats with each thermal expansion block. The cable management assemblies minimize lateral and longitudinal cable movements in vertical installations. The folded bracket flanges in the cable cleat attachment area prevent cleat damage during a short circuit event.

The thermal expansion block of the first embodiment provides 150 mm spacing thereby providing a high level of short circuit protection. The brackets with slots are easy to install and allow for flexibility of installation over a range of ladder rung shapes and sizes.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable management assembly for mounting cables to a ladder rack, the cable management assembly comprising:
   a thermal expansion block positioned on a ladder rung of the ladder rack; the thermal expansion block having a top, a bottom, a first side, a second side, and ends, wherein the first side and the second side having an opening there through;
   a cable attachment beam received in the openings in the sides of the thermal expansion block, wherein the cable attachment beam having a top, a bottom, sides, and ends; wherein the ends include folded edges for protecting a cable cleat during a short circuit event, wherein the bottom of the cable attachment beam include flanges spaced from the folded edges at the ends of the cable attachment beam, wherein the flanges and adjacent folded edges define a mounting area for the cable cleat; and
   a bracket for securing the thermal expansion block to the ladder rung.

2. The cable management assembly of claim 1, wherein the openings in the sides of the thermal expansion block are T-shaped.

3. The cable management assembly of claim 2, wherein the T-shaped openings are aligned to create a passageway through the expansion block.

4. The cable management assembly of claim 1, wherein the sides of the thermal expansion block having outwardly extending flanges, the outwardly extending flanges having an opening for receiving a fastener.

5. The cable management assembly of claim 4, wherein the bracket is secured to the thermal expansion block by fasteners extending through the opening in the outwardly extending flanges of the thermal expansion block.

6. A cable management assembly for mounting cables to a ladder rack, the cable management assembly comprising:
   a thermal expansion block positioned on a ladder rung of the ladder rack; the thermal expansion block having a top, a bottom, a first side, a second side, and ends, wherein the first side and the second side having an opening there through;
   a cable attachment beam received in the openings in the sides of the thermal expansion block;
   wherein the cable attachment beam having a top, a bottom, sides, and ends; wherein the ends include folded edges for protecting a cable cleat during a short circuit event, wherein the cable attachment beam having beam retaining clips extending from the top of the cable attachment beam, the thermal expansion block is positioned between the beam retaining clips; and
   a bracket for securing the thermal expansion block to the ladder rung.

7. A cable management assembly for mounting cables to a ladder rack, the cable management assembly comprising:
   a thermal expansion block positioned on a ladder rung of the ladder rack; the thermal expansion block having a top, a bottom, a first side, a second side, and ends, wherein the first side and the second side having an opening there through;
   a cable attachment beam received in the openings in the sides of the thermal expansion block; and
   a bracket for securing the thermal expansion block to the ladder rung, the bracket includes a main member with a first end, a second end, and sides; wherein the first end includes a U-shaped slot and folded edges, and the second end includes a slot.

8. The cable management assembly of claim 7, wherein fasteners slide within the U-shaped slot at the first end and the slot at the second end of the bracket for enabling the thermal expansion block to be secured to the ladder rung.

* * * * *